(12) United States Patent
Wei (10) Patent No.: US 7,004,867 B2
(45) Date of Patent: Feb. 28, 2006

(54) TOP SPROCKET FOR A REAR SPROCKET ASSEMBLY AND REAR SPROCKET ASSEMBLY FOR A BICYCLE

(75) Inventor: Yu Wei, Kunshan (CN)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/032,207

(22) Filed: Jan. 11, 2005

(65) Prior Publication Data
US 2005/0119080 A1    Jun. 2, 2005

Related U.S. Application Data

(63) Continuation of application No. 10/231,024, filed on Aug. 30, 2002, now Pat. No. 6,923,741.

(51) Int. Cl.
*F16H 7/08* (2006.01)

(52) U.S. Cl. ............................ 474/160; 474/152

(58) Field of Classification Search ............ 474/148, 474/152, 157, 158, 160
See application file for complete search history.

(56) References Cited

U.S. PATENT DOCUMENTS

| | | |
|---|---|---|
| 3,661,021 A | 5/1972 | Ohshita |
| 3,900,088 A | 8/1975 | Ozaki |
| 4,268,259 A | 5/1981 | Segawa et al. |
| 4,392,841 A | 7/1983 | Juy |
| 4,773,893 A | 9/1988 | Su et al. |
| 4,889,521 A | 12/1989 | Nagano |
| 5,073,151 A | 12/1991 | Nagano |
| 5,192,248 A | 3/1993 | Nagano |
| 5,192,249 A | 3/1993 | Nagano |
| 5,194,051 A | 3/1993 | Nagano |
| 5,299,925 A | 4/1994 | Chang |
| 5,437,582 A | 8/1995 | Romano |
| 5,480,357 A | 1/1996 | Liang |
| 5,569,107 A | 10/1996 | Mu |
| 5,716,297 A | 2/1998 | Bodmer |
| 5,733,215 A | 3/1998 | Hsu et al. |
| 6,013,001 A * | 1/2000 | Miyoshi ............ 474/160 |
| 6,139,456 A | 10/2000 | Lii et al. |
| 6,264,575 B1 | 7/2001 | Lim et al. |
| 6,340,338 B1 | 1/2002 | Kamada |
| 6,488,603 B1 * | 12/2002 | Lim et al. ............ 474/160 |

* cited by examiner

*Primary Examiner*—Vicky A. Johnson
(74) *Attorney, Agent, or Firm*—Shinjyu Global IP Counselors, LLP (57) ABSTRACT

A rear sprocket assembly has a plurality of sprockets with the smallest sprocket being a top or first sprocket. At least one of the teeth is a down shift tooth that has a recessed side surface to assist in shifting the chain to the next larger sprocket. Preferably, all of the teeth of the top sprocket are identical. The sprocket body of the top sprocket is threaded to be coupled to a freewheel or hub. A second sprocket is located adjacent the top sprocket and preferably cooperates with the top sprocket during a down shift from the top sprocket to the second sprocket. The second sprocket cooperates with a third sprocket during a down shift from the second sprocket to the third sprocket.

20 Claims, 8 Drawing Sheets

TOP SPROCKET FOR A REAR SPROCKET ASSEMBLY AND REAR SPROCKET ASSEMBLY FOR A BICYCLE

CROSS-REFERENCE TO RELATED APPLICATIONS

This application is a continuation application of U.S. patent application Ser. No. 10/231,024 filed on Aug. 30, 2002, now U.S. Pat. No. 6,923,741. The entire disclosure of U.S. patent application Ser. No. 10/231,024 is hereby incorporated herein by reference.

BACKGROUND OF THE INVENTION

1. Field of the Invention

This invention generally relates to a sprocket for a bicycle. More specifically, the present invention relates a top sprocket for a rear sprocket assembly and a rear sprocket assembly for a bicycle, which has a simplified mounting structure and provides smooth reliable shifting.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned over the past years is the bicycle drive train. Specifically, manufacturers of bicycle components have been continually improving shifting performance of the various shifting components such as the shifter, the shift cable, the derailleur, the chain and the sprocket or sprockets.

One particular component of the drive train that has been extensively redesigned in the past years is the sprocket assembly for the bicycle. More specifically, the bicycle sprocket assembly has been designed with improved sprockets to provide smoother shifting. More specifically, the Hyper Glide sprocket assembly (HG rear sprocket assembly) described in U.S. Pat. No. 4,889,521 to Nagano has been developed and marketed worldwide. This sprocket assembly has been well accepted in the market and this engineering design for the sprocket assembly has become one of the industrial standards. Specifically, the HG rear sprocket assembly used with derailleurs in racing and mountain bicycles has become an industrial standard.

The HG sprockets typically have a chain guide surface on the smaller sprocket side of each sprocket, except for the smallest sprocket. The chain guide surface is positioned to receive a link plate and pin of the chain so as to move the chain much closer for smooth down shifting. Down shifting typically means shifting from a smaller rear sprocket to a larger rear sprocket so as to decrease gear ratio. A pair of adjacent sprockets are positioned relative to each other and relative to the chain guide surface with a particular phase relation. In order to maintain such phase relation, each sprocket has splines formed at its inner periphery. One of the splines is a different shape from the other splines to guide the sprockets on mating splines formed on the outer body of a multiple freewheel or free hub. The different shaped splines insure that adjacent sprockets are oriented in the proper phase relation.

Typically, in this type of sprocket assembly, the smallest top sprocket also has splines formed on its inner periphery, and a lock ring is used to fix the smallest sprocket to the multiple freewheel or free hub. In this construction, all of the sprockets from smallest to largest have inner splines. While such a sprocket design provides for smooth reliable shifting, this construction can be relatively complicated and expensive to manufacture and assemble.

Accordingly, in recent years, the smallest sprocket has been formed with screw threads as a conventional sprocket, while the remaining sprockets are formed with inner splines. In this construction, the lock ring is eliminated to achieve a sprocket assembly that is easier and less expensive to manufacture and assemble. However, in such a sprocket assembly, because the smallest sprocket is threaded onto the outer body, an unstable phase relation with the second sprocket occurs. This unstable phase relation causes unstable down shifting from the smallest sprocket to the second sprocket. Accordingly, there is a strong demand to improve shifting from the smallest sprocket to the second sprocket on such a sprocket assembly without significantly increasing the complexity in manufacturing and assembling the sprocket assembly, and thus, increasing the cost of the sprocket assembly.

In view of the above, there exists a need for a top sprocket for a rear sprocket assembly and a rear sprocket assembly for a bicycle which overcomes the above mentioned problems in the prior art. This invention addresses this need in the prior art as well as other needs, which will become apparent to those skilled in the art from this disclosure.

SUMMARY OF THE INVENTION

One object of the present invention is to provide a top sprocket for a sprocket assembly which can be arranged at variety phase relationships relative to a second sprocket while providing smooth, reliable shifting performance.

Another object of the present invention is to provide a sprocket assembly utilizing a simplified mounting technique for the top sprocket while providing smooth, reliable shifting performance.

Still another object of the present invention is to provide top sprocket for a sprocket assembly and a sprocket assembly for a bicycle, which are relatively simple and inexpensive to manufacture and assemble.

The foregoing objects can basically be attained by providing a top sprocket for a rear sprocket assembly for a bicycle. The top sprocket has first and second axially facing sides with a center plane arranged therebetween, a sprocket body and a plurality of circumferentially spaced teeth extending radially outwardly from an outer periphery of the sprocket body to form a plurality of circumferentially spaced roots arranged in an alternating arrangement between the teeth. A first tooth of the teeth includes a tip portion and a recessed side surface. The tip portion has a first side surface located on the first side, a second side surface located on the second side and an end surface extending between the first and second side surfaces. The recessed side surface extends in a peripheral direction on the first side. The recessed side surface is located radially inwardly of the tip portion on the first side. The recessed side surface is arranged and configured to be at least partially axially closer to the second side along a rearward portion of the recessed side surface than a forward portion of the recessed side surface.

The foregoing objects can also basically be attained by providing a multi-stage sprocket assembly for a bicycle that includes a first sprocket and a second sprocket larger than the first sprocket. The first sprocket has first and second axially facing sides with a center plane arranged therebetween, a first sprocket body, and a plurality of circumferentially spaced first teeth extending radially outwardly from an outer periphery of the first sprocket body to form a plurality of circumferentially spaced first roots arranged in an alternating arrangement between the first teeth. The first sprocket body has a threaded mounting section located at an inner periphery thereof. A first down shift tooth of the first teeth includes a tip portion and a recessed side surface. The tip portion has a first side surface located on the first side, a second side surface located on the second side and an end surface extending between the first and second side surfaces. The recessed side surface extends in a peripheral direction on the first side. The recessed side surface is located radially inwardly of the tip portion on the first side. The recessed side surface is arranged and configured to be at least partially axially closer to the second side along a rearward portion of the recessed side surface than a forward portion of the recessed side surface. The second sprocket is disposed adjacent the first sprocket. The second sprocket has a third axially facing side adjacent the second side of the first sprocket, a fourth axially facing side, a second sprocket body, and a plurality of circumferentially spaced second teeth extending radially outwardly from an outer periphery of the second sprocket body.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
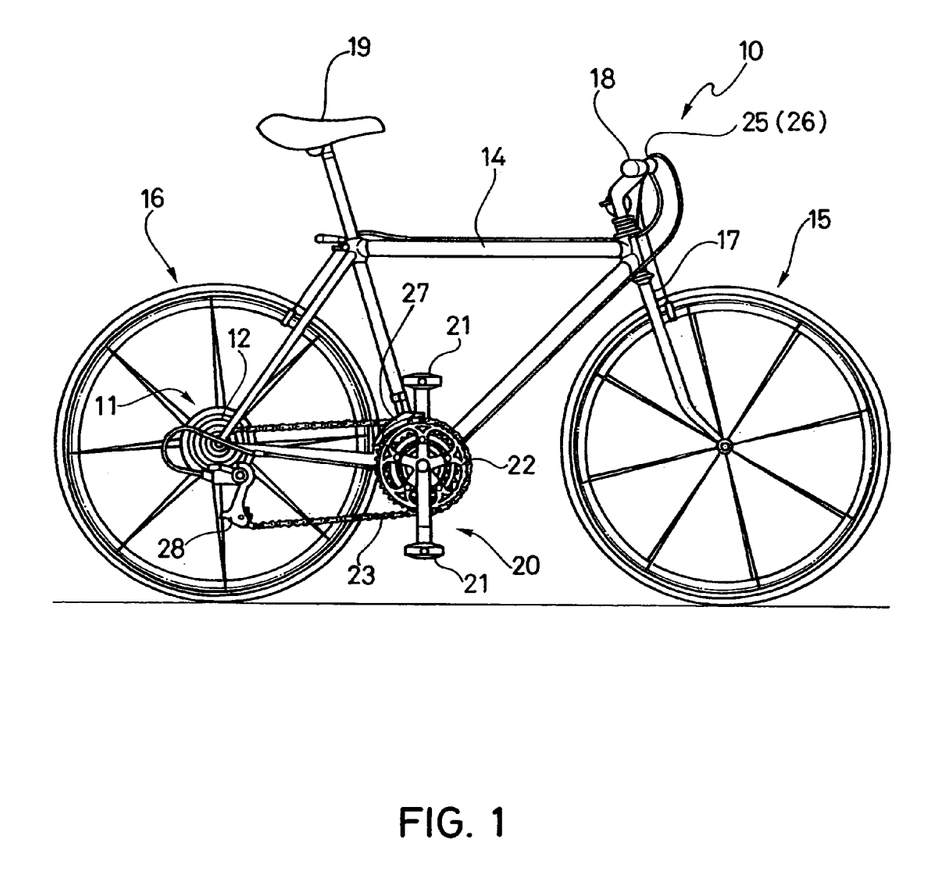
FIG. 1 is a side elevational view of a bicycle having a rear wheel with a sprocket assembly in accordance with the present invention.
Figure 2:
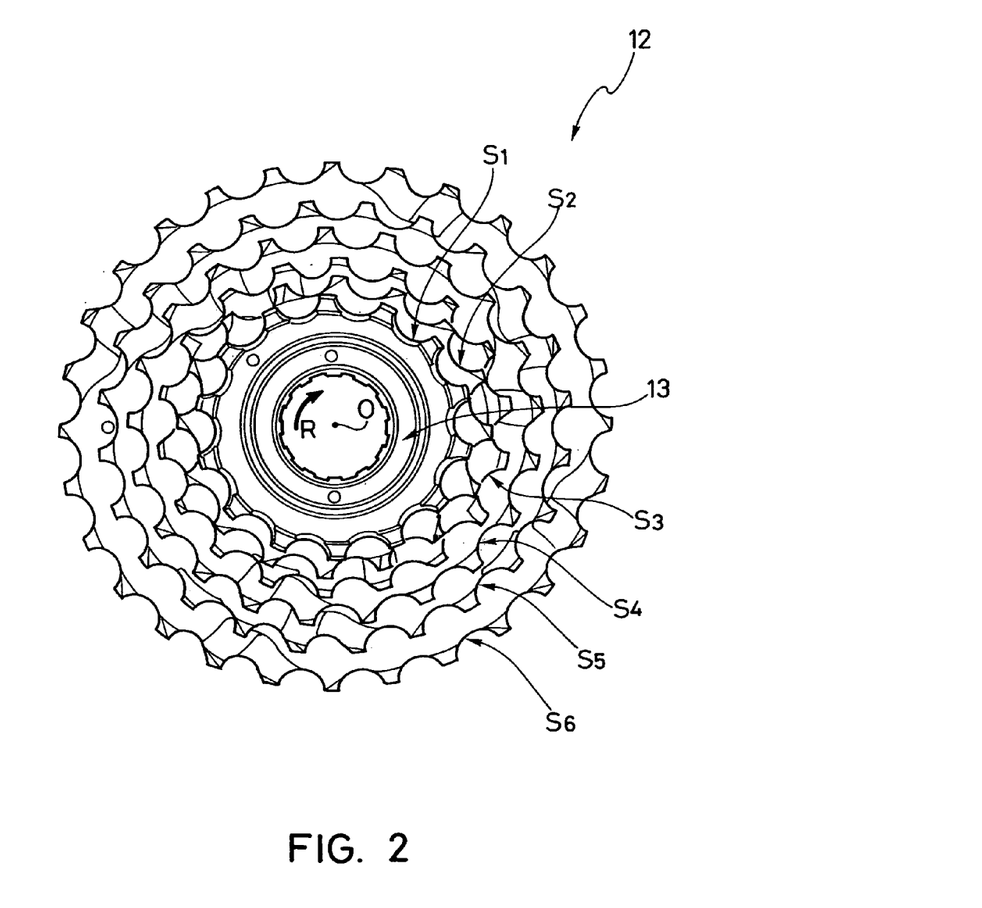
FIG. 2 is a side elevational view of the six-stage sprocket assembly in accordance with the present invention.
Figure 3:
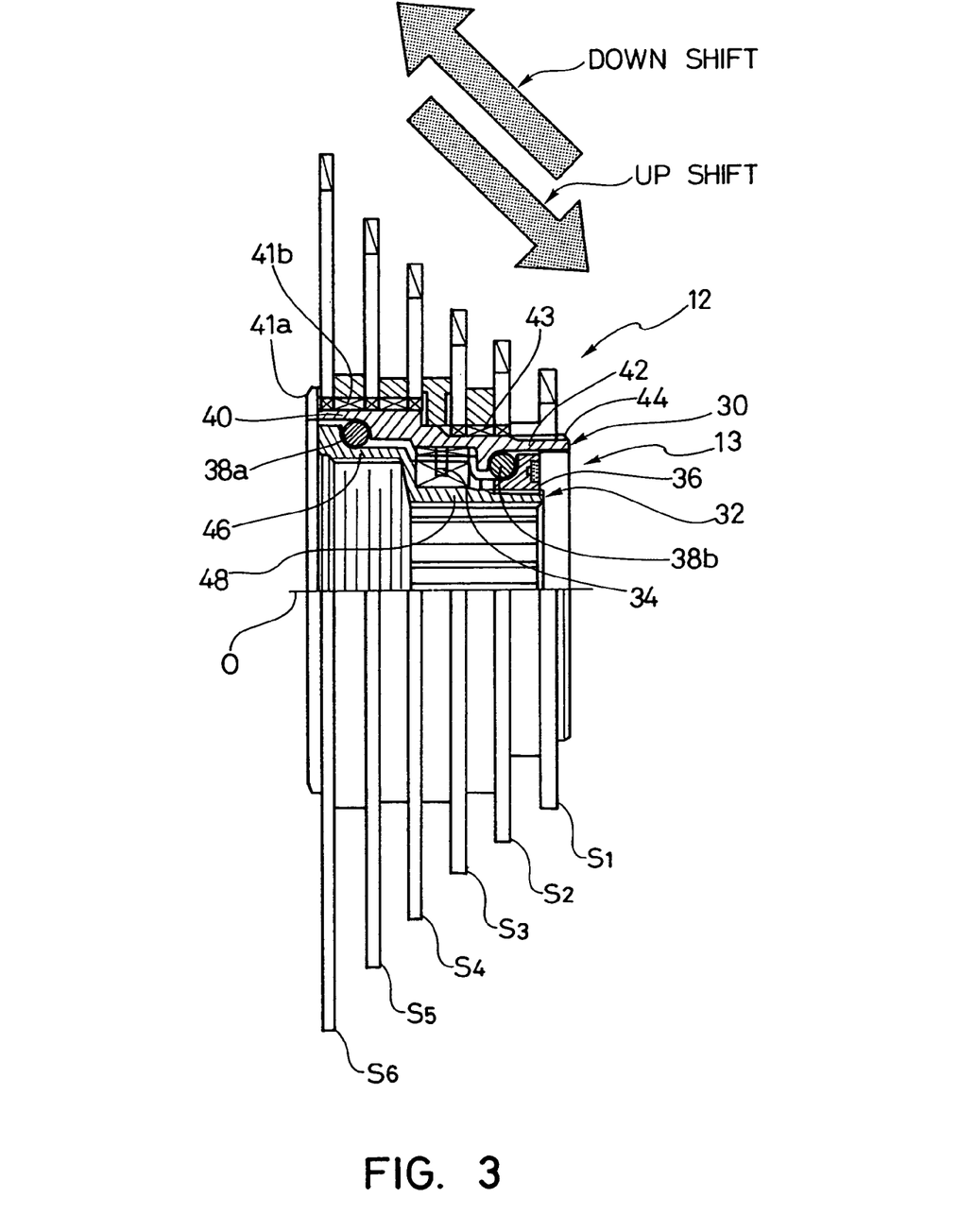
FIG. 3 is a partial rear diagrammatic elevational view of the six-stage sprocket assembly according to the present invention with the upper half shown in cross-section.

Referring initially to FIGS. 1–3, a conventional bicycle 10 is illustrated having a rear bicycle hub 11 with a rear multi-stage sprocket assembly 12 in accordance with a preferred embodiment of the present invention. The multi-stage sprocket assembly 12 preferably includes first and second sprockets $S_1$ and $S_2$ in accordance with the present invention, as well as third-sixth conventional sprockets $S_3$–$S_6$, as discussed below. In particular, the first and second sprockets $S_1$ and $S_2$ are designed such that the precise phase relationship between the teeth of the first and second sprockets $S_1$ and $S_2$ is not critical to smooth, reliable shifting performance. Moreover, due to the design of the teeth of the first and second sprockets $S_1$ and $S_2$, the first-sixth sprockets $S_1$–$S_6$ are preferably mounted to a freewheel 13 of the rear hub 11 in a simplified manner.

The bicycle 10 basically has a frame 14 with front and rear wheels 15 and 16 rotatably coupled thereto. A front fork 17 is coupled between the frame 14 and the front wheel 15 in a conventional manner. Turning a handlebar 18, which is fixedly coupled to the front fork 17, turns the front wheel 15. The rear wheel 16 is rotatably coupled to a rear portion of the frame 14 via the rear hub 11. The frame 14 also has a seat 19 adjustably coupled to the frame 14 and a drive train 20 for propelling the bicycle 10. The bicycle 10 is conventional except for selected parts of the drive train 20, as discussed below.

Since the various parts of the bicycle 10 and most of the parts of the drive train 20 are well known in the bicycle art, these parts of the bicycle 10 will not be discussed or illustrated in detail herein, except as they are modified in accordance with the present invention. Moreover, various conventional bicycle parts such as brakes, additional sprockets, etc., which are not illustrated and/or discussed in detail herein, can be used in conjunction with the present invention.

As used herein, the terms "forward, rearward, above, below, lateral and transverse" refer to those directions of a bicycle in its normal riding position, to which the sprocket assembly 12 is attached. Accordingly, these terms, as utilized to describe the sprocket assembly 12 in the claims, should be interpreted relative to bicycle 10 in its normal riding position. However, the terms "down shift" and "up shift" as used herein in reference to the rear sprocket assembly 12 should be interpreted to mean a shift from smaller to larger sprocket and from larger to smaller sprocket, respectively, as shown in FIG. 3. Moreover, the terms "phase relation", "phase relationship" and "angular phase relation" as used herein should be construed to mean the angular relationship between a pair of adjacent sprockets.

Referring to FIGS. 1–4, the drive train 20 basically includes the rear multi-stage sprocket assembly 12 of the present invention, a pair of pedals 21, a front multi-stage sprocket assembly 22 mounted to rotate with the pedals 21, and a chain 23 extending between the rear multi-stage sprocket assembly 12 and the front multi-stage sprocket assembly 22. As mentioned above, the sprocket assembly 12 is preferably coupled to the rear hub 11 via the freewheel 13. The pedals 21 are coupled to the front multi-stage sprocket assembly 22 by a conventional crank set to transfer force from the rider to the chain 23. The force from the chain 23 is then selectively transferred to the rear wheel 16 via the rear hub 11 (e.g. via the rear sprocket assembly 12 and the freewheel 13 depending on the direction of rotation) in a conventional manner.

The drive train 20 is basically controlled by conventional front and rear shifting units 25 and 26 that control the lateral positions of front and rear derailleurs 27 and 28 in a conventional manner. Thus, when the rider is pedaling, the front and rear sprocket assemblies 22 and 12 are rotating to circulate the chain 23 due to the movement of the pedals 21. The shifting units 25 and 26 can be actuated by the rider to control the position of the front and/or rear derailleurs 27 and/or 28. Thus, when the chain 23 is circulated in the forward (clockwise direction as seen in FIG. 1), the shifting units 25 and 26 can be actuated to control the gear ratio of the drive train 20 by controlling the lateral position of the chain 23 via the derailleurs 27 and 28. The derailleurs 27 and 28 selectively apply a lateral force F inwardly/outwardly to the chain 23 to cause up/down shifts. The drive train 20 is basically conventional, except for the rear multi-stage sprocket assembly 12. Thus, the drive train 20 will not be discussed and/or illustrated in detail herein, except as related to the rear multi-stage sprocket assembly 12.

Referring to FIGS. 2 and 3, the rear sprocket assembly 12 in accordance with a preferred embodiment of the present invention will now be discussed. In the illustrated embodiment, the rear sprocket assembly 12 is a six-stage sprocket assembly with sprockets $S_1$–$S_6$ being spaced from each other at predetermined intervals. The sprockets $S_1$–$S_6$ are fixedly mounted on the freewheel 13 of the rear hub 11 in a relatively conventional manner such that the sprockets $S_1$–$S_6$ rotate together about a center hub rotation axis O. The sprockets $S_1$–$S_6$ typically rotate together in a forward rotational direction R (e.g., in a clockwise direction as viewed in FIG. 2) when the rider is pedaling in a forward (clockwise) direction to propel the bicycle 10 in a forward direction as seen in FIG. 1.

It will be apparent to those skilled in the bicycle art from this disclosure that a sprocket assembly in accordance with the present invention can have fewer or more sprockets. In other words, the present invention can be any multi-stage sprocket assembly for a bicycle that uses a derailleur or the like and which includes at least one large sprocket and at least one small sprocket.

Figure 4:
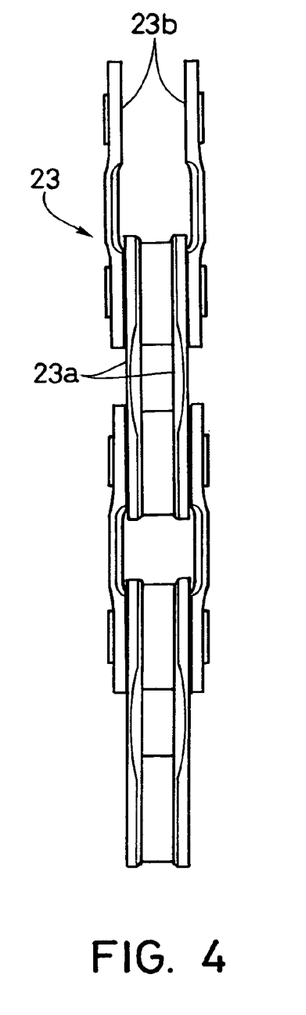
FIG. 4 is an enlarged partial top plan view of a portion of the chain that is used with the sprocket assembly illustrated in FIGS. 2 and 3 in accordance with the present invention.
Figure 5:
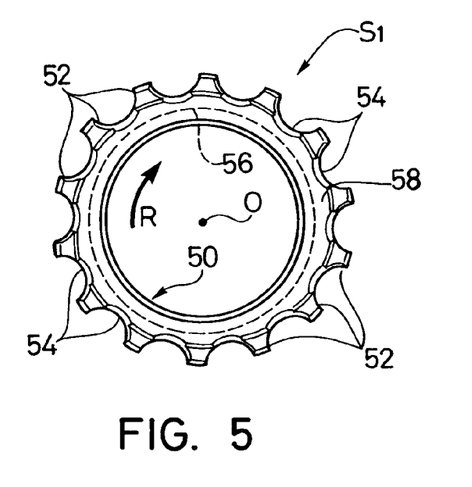
FIG. 5 is an outside elevational view of a first or top sprocket of the sprocket assembly illustrated in FIGS. 1–3, which has fourteen teeth.
Figure 6:
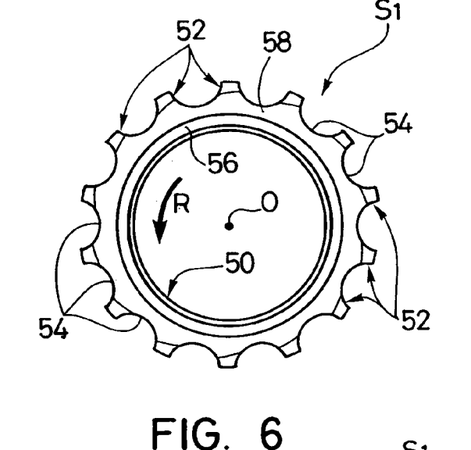
FIG. 6 is an inside or large sprocket side elevational view of the first or top sprocket illustrated in FIG. 5.
Figure 7:
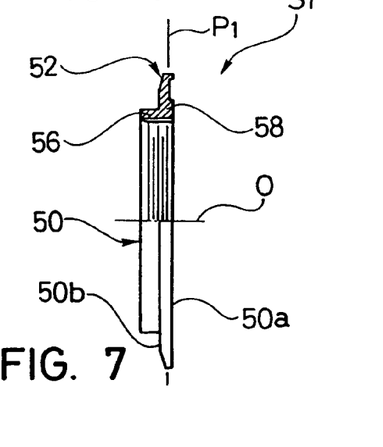
FIG. 7 is a partial diagrammatic elevational view of the first or top sprocket illustrated in FIGS. 5 and 6 with the upper half shown in cross-section.
Figure 8:
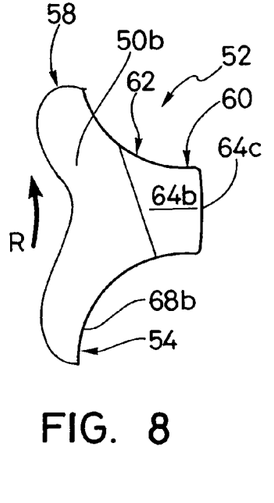
FIG. 8 is a partial, large sprocket side elevational view of a first down shift tooth of the first or top sprocket illustrated in FIGS. 5–7.
Figure 9:
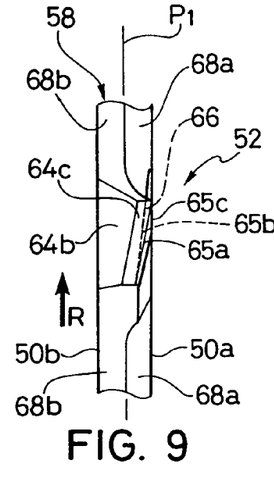
FIG. 9 is a partial, overhead plan view of the first down shift tooth of the first or top sprocket illustrated in FIG. 8.
Figure 10:
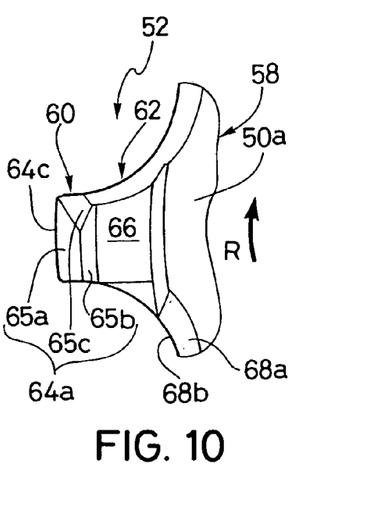
FIG. 10 is a partial, outside elevational view of the first down shift tooth of the first or top sprocket illustrated in FIGS. 8 and 9.
Figure 11:
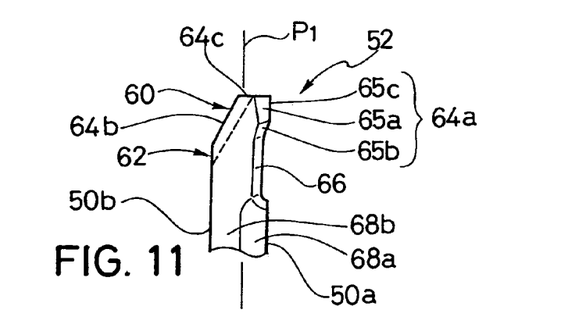
FIG. 11 is a partial rear end elevational view of the first down shift tooth of the first or top sprocket illustrated in FIGS. 8–10, as viewed along a forward rotational direction of the first or top sprocket.
Figure 12:
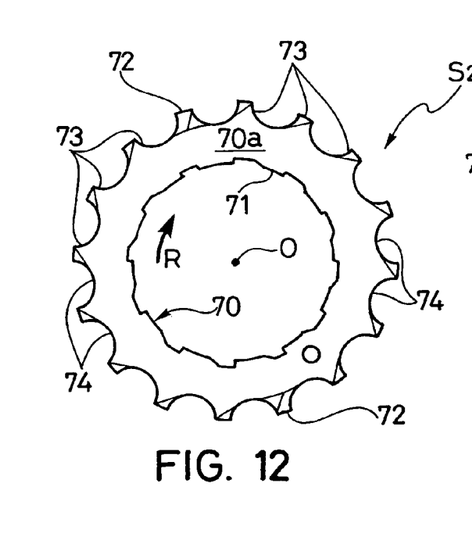
FIG. 12 is a small sprocket side elevational view of a second sprocket of the sprocket assembly illustrated in FIGS. 1–3, which has sixteen teeth.
Figure 13:
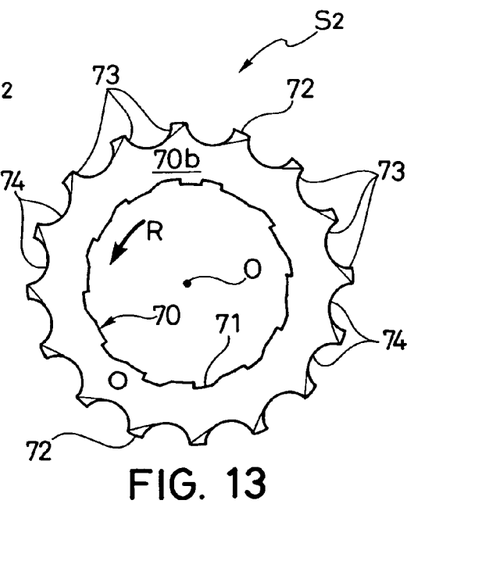
FIG. 13 is a large sprocket side elevational view of the second sprocket illustrated in FIG. 12.
Figure 14:
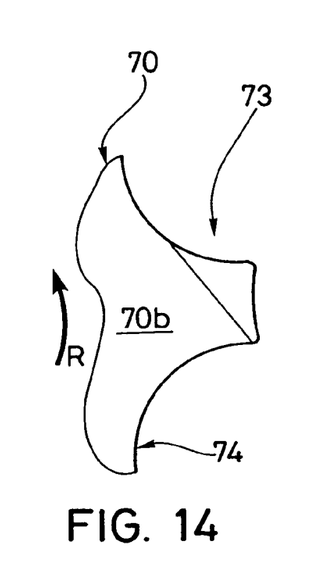
FIG. 14 is a partial, large sprocket side elevational view of a second driving tooth of the second sprocket illustrated in FIGS. 12 and 13.
Figure 15:
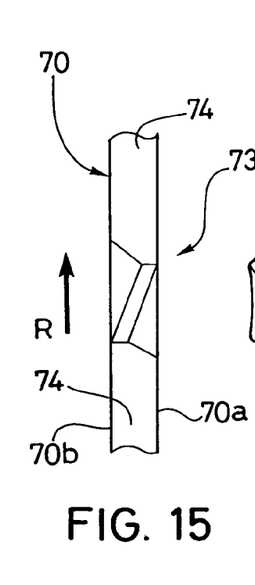
FIG. 15 is a partial, overhead plan view of the second driving tooth of the second sprocket illustrated in FIG. 14.
Figure 16:
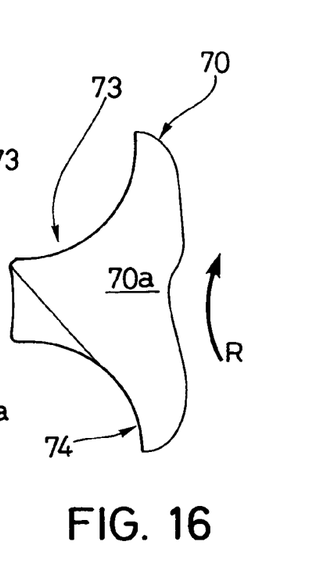
FIG. 16 is a partial, small sprocket side elevational view of the second driving tooth of the second sprocket illustrated in FIGS. 14 and 15.
Figure 17:
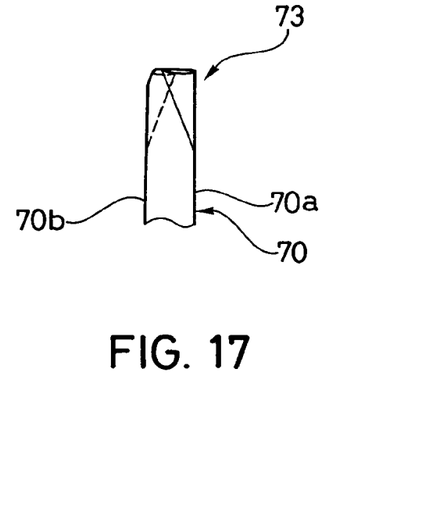
FIG. 17 is a partial rear end elevational view of the second driving tooth of the second sprocket illustrated in FIGS. 14–16, as viewed along a forward rotational direction of the second sprocket.
Figure 18:
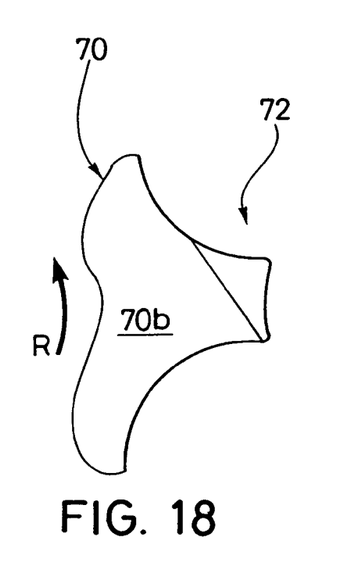
FIG. 18 is a partial, large sprocket side elevational view of a second down shift tooth of the second sprocket illustrated in FIGS. 12 and 13.
Figure 19:
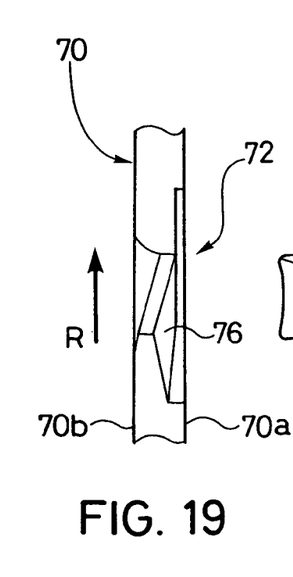
FIG. 19 is a partial, overhead plan view of the second down shift tooth of the second sprocket illustrated in FIG. 18.
Figure 20:
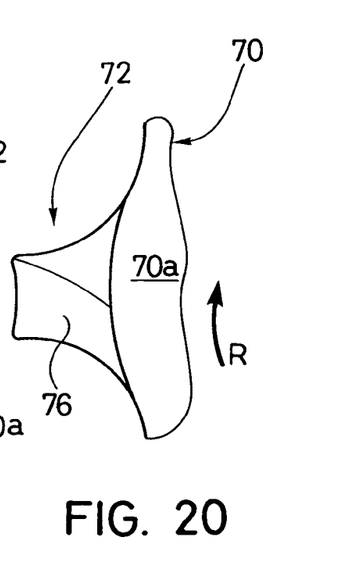
FIG. 20 is a partial, small sprocket side elevational view of the second down shift tooth of the second sprocket illustrated in FIGS. 18 and 19.
Figure 21:
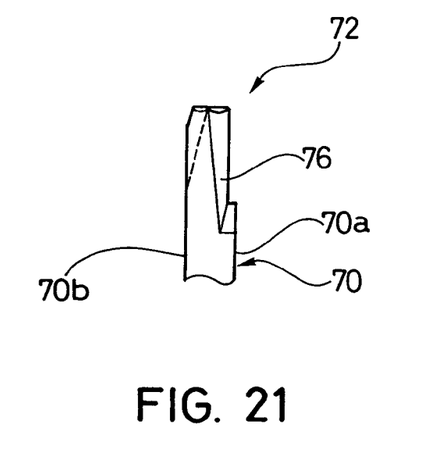
FIG. 21 is a partial rear end elevational view of the second down shift tooth of the second sprocket illustrated in FIGS. 18–20, as viewed along a forward rotational direction of the second sprocket.
Figure 22:
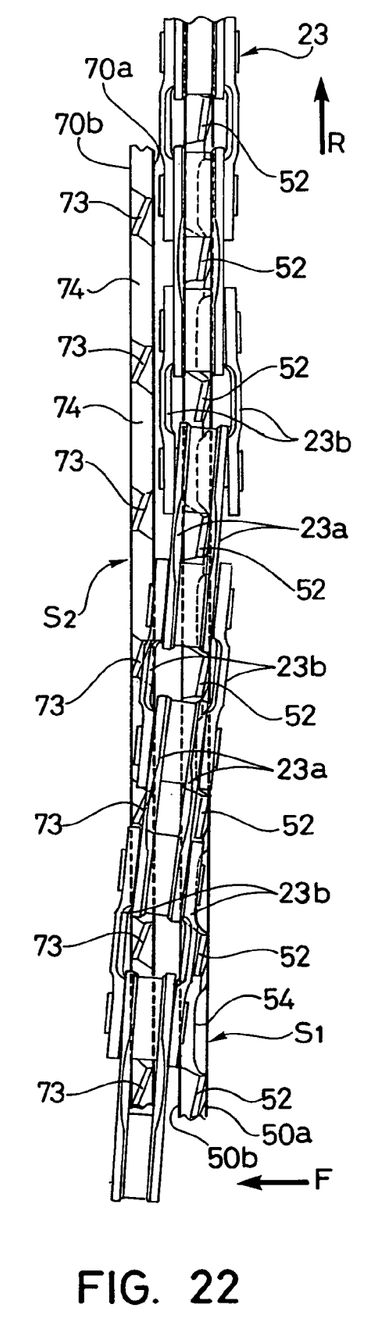
FIG. 22 is a partial bottom plan view of the first and second sprockets with the chain being down shifted from the first sprocket to the second sprocket.

The multi-stage sprocket assembly 12 is adapted to engage with the drive chain 23, which is a conventional style bicycle chain as seen in FIG. 4. The drive chain 23 is a continuous loop that has a plurality of inner link plates 23a and a plurality of outer link plates 23b that are pivotally connected to each other by articulation pins and rollers. During a chain shifting process, the chain 23 is shifted from one of the sprocket $S_1$–$S_6$ to the next adjacent sprocket $S_1$–$S_6$ by the rear derailleur 28 moving the chain 23 in an axial direction relative to the axis of rotation O of the sprockets $S_1$–$S_6$.

Referring to FIG. 3, the sprocket assembly 12 is illustrated in partial cross-section with arrows showing the directions of an up shift and a down shift. An up shift occurs when the chain 23 is moved from a large sprocket to the next smaller sprocket, while a down shift occurs when the chain 23 is shifted from a small sprocket to the next larger sprocket. The sprockets $S_1$–$S_6$ are designed so that the chain 23 can execute smooth down shifting and up shifting motions. In the illustrated embodiment, the sprockets $S_3$–$S_6$ are conventional, while the sprockets $S_1$ and $S_2$ include modified teeth to improve the down shifting of the chain 23 from the top (smallest, first) sprocket $S_1$ to the second sprocket $S_2$, and from the second sprocket $S_2$ to the third sprocket $S_3$.

More specifically, the sprockets $S_3$–$S_6$ are configured substantially in accordance with U.S. Pat. No. 4,889,521, except that the sprockets $S_3$–$S_6$ have different numbers of teeth. In particular, the sprockets $S_3$–$S_6$ have teeth configurations of 18T-21T-24T-28T, respectively. Accordingly, the sprockets $S_3$–$S_6$ will not be discussed and/or illustrated in detail herein, except as related to shifts to/from the sprocket $S_2$. In the illustrated embodiment, the first sprocket $S_1$ preferably has fourteen (14T) teeth, while the second sprocket $S_2$ preferably has sixteen (16T) teeth. The present invention is optimized for the small first sprocket $S_1$, the second sprocket $S_2$ and the third sprocket $S_3$ having an even number of teeth, as discussed below in more detail.

In any case, it will be apparent to those skilled in the bicycle art from this disclosure that the various sprockets $S_1$–$S_6$ of the present invention can have various configurations as needed and/or desired. In particular, at least the sprockets $S_4$–$S_6$ can be formed with an even or odd number of teeth so long as the third sprocket $S_3$ is configured to be used adjacent the second sprocket $S_2$ of the present invention and the fourth sprocket $S_4$.

The first and second sprockets $S_1$ and $S_2$ preferably have an even number of teeth such that the precise phase relationship between the teeth of the first sprocket $S_1$ and the second sprocket $S_2$ is not critical to down shifting therebetween. In other words, the first and second sprockets $S_1$ and $S_2$ are configured such that regardless of the angular phase relationship between these two sprockets, at least a pair of smooth down shifting paths can be formed therebetween, as explained below in more detail.

In the illustrated embodiment, the sprockets $S_1$–$S_6$ have varying thicknesses and varying axial spaces formed therebetween. In particular, the sprocket $S_1$ has a thickness of about 2.2 millimeters, while the sprockets $S_2$–$S_4$ have thicknesses of about 1.8 millimeters. The sprockets $S_5$ and $S_6$ have thicknesses of about 1.6 millimeters. The axial space between the first and second sprockets $S_1$ and $S_2$ is preferably about 3.8 millimeters, while the axial space between the second sprocket $S_2$ and the third sprocket $S_3$ is preferably about 3.68 millimeters. The axial space between the third sprocket $S_3$ and the fourth sprocket $S_4$ is preferably about 3.6 millimeters. The axial space between the fourth sprocket $S_4$ and the fifth sprocket $S_5$ is preferably about 3.7 millimeters, while the axial space between the fifth sprocket $S_5$ and the sixth sprocket $S_6$ is preferably about 3.9 millimeters. Spacers are utilized in a relatively conventional manner to create the optimal spacing between the sprockets $S_1$–$S_6$. Thus, there are varying axial spaces between the sprockets $S_1$–$S_6$ and varying thicknesses of the sprockets $S_1$–$S_6$ to optimize shifting of the chain 23 therebetween. The sprockets $S_1$–$S_6$ are preferably constructed of a lightweight, rigid material such as a metallic material.

In the illustrated embodiment, the first sprocket $S_1$ is mounted in a simplified manner as mentioned above. In particular, the first sprocket $S_1$ is threadably mounted on the freewheel 13. Thus, a locking cone (not shown) typically used to secure the sprockets such as $S_1$, $S_2$, $S_3$, etc. on the freewheel 13 can be eliminated. Moreover, the first sprocket $S_1$ is preferably formed with an integrated spacer to space the first sprocket $S_1$ an optimal distance from the second sprocket $S_2$.

As mentioned above, the sprockets $S_1$–$S_6$ are preferably mounted on the freewheel 13 to rotate therewith. The freewheel 13 is relatively conventional, and thus, will not be discussed and/or illustrated in detail herein, except as related to the sprocket assembly 12 of the present invention. Specifically, the freewheel 13 basically includes an outer tubular member 30, an inner tubular member 32, a one-way clutch 34, a retaining member 36 and a plurality of ball bearings 38a and a plurality of ball bearings 38b.

The outer tubular member 30 is coupled to the inner tubular member 32 via the one-way clutch 34 and the bearings 38a and 38b in a conventional manner to freely rotate relative to the inner tubular member 32 in the reverse direction (counterclockwise as viewed in FIG. 2) and to rotate with the inner tubular member 32 in the forward rotational direction (clockwise) in a conventional manner. In other words, the freewheel 13 operates in a conventional manner so that when the rider is pedaling in the forward direction, the chain 23 transmits forward (clockwise) torque to the freewheel 13 which in turn transmits torque to the rear wheel 16.

The outer tubular member 30 is preferably a step-shaped member that basically includes a first outer tubular portion 40 and second outer tubular portion 42. The first outer tubular portion 40 has a retaining flange 41a and a plurality of splines 41b designed to non-rotatably engage the sprockets $S_4$–$S_6$ in a conventional manner. One of the splines 41b preferably has a different shape so as to orient the phase relationship of the sprockets $S_4$–$S_6$ relative to each other, and to orient the third sprocket $S_3$ relative to the fourth sprocket $S_4$. The first outer tubular portion 40 has a diameter that is larger in diameter than the second tubular portion 42.

Similarly, the second outer tubular portion 42 includes splines 43 designed to non-rotatably engage the sprockets $S_2$ and $S_3$ in a conventional manner to non-rotatably couple the sprockets $S_2$ and $S_3$ thereto. One of the splines 41b preferably has a different shape so as to orient the phase relationship of the sprockets $S_2$ and $S_3$ relative to each other, and to orient the third sprocket $S_3$ relative to the fourth sprocket $S_4$. The second outer tubular portion 42 also preferably includes a threaded end section 44 formed at a free end thereof to threadedly couple the first or top sprocket $S_1$ thereto. In the illustrated embodiment, the threaded end section 44 is formed with external threads. Thus, the first sprocket $S_1$ retains the remaining sprockets $S_2$–$S_6$ axially on the outer tubular member 30.

The inner tubular member 32 is also preferably a step-shaped member with a first inner tubular portion 46 and a second inner tubular portion 48. The bearings 38a are coupled between the first inner and outer tubular portions 46 and 40 of the inner and outer tubular members 32 and 30, respectively. The bearings 38b are coupled between the second inner and outer tubular portions 48 and 42 of the inner and outer tubular members 32 and 30. The one-way clutch 34 is arranged axially between the bearings 38a and 38b. The second inner tubular portion 48 of the inner tubular member 32 also preferably has external threads formed at a free end thereof to threadedly receive the retaining member 36 to couple the outer tubular member 30 with the inner tubular member 32. The freewheel 13 operates in a conventional manner. Thus, the freewheel 13 will not be discussed and/or illustrated in further detail herein, except as related to the sprocket assembly 12 of the present invention.

Referring now to FIGS. 5–11, the first or top sprocket $S_1$ in accordance with the present invention basically includes a first sprocket body 50 and a plurality of circumferentially arranged first teeth 52 coupled to the outer periphery of the first sprocket body 50. The first teeth 52 are preferably circumferentially equally spaced from each other to form a plurality of circumferentially equally spaced first troughs or roots 54 arranged in an alternating manner between the first teeth 52. In the illustrated embodiment, the teeth 52 are preferably twisted teeth that are identical to each other. Moreover, in the illustrated embodiment, the sprocket $S_1$ preferably has fourteen teeth 52 and fourteen roots 54. In any case, the first sprocket $S_1$ preferably includes an even number of teeth 52 and roots 54 in order to create the proper phase relationship between the first sprocket $S_1$ and the second sprocket $S_2$ which will be discussed in below.

As mentioned above, all of the teeth 52 are preferably twisted teeth that are identical to each other. Due to this arrangement, all of the teeth 52 are capable of acting as down shift teeth in order to shift the chain 23 from the smallest sprocket $S_1$ to the second sprocket $S_2$. However, in the illustrated embodiment, typically only two of the teeth 52 will actually function as down shift teeth in that only two teeth are typically in proper phase with the second sprocket $S_2$ when the sprocket assembly 12 is coupled together. More specifically, two circumferentially equally spaced teeth 52 will preferably act as down shift teeth, which are in proper phase relation with respect to teeth of the second sprocket $S_2$, as discussed in more detail below. In other words, the two teeth 52 that will act as down shift teeth will depend on the phase relationship between the sprocket $S_1$ and the sprocket $S_2$ once assembled together.

The first sprocket body 50 is basically an L-shaped member as viewed in cross-section. The first sprocket body 50 basically includes a central mounting section 56 and a radially extending tooth attachment portion 58. A first center plane $P_1$ of the first sprocket body 50 is arranged between first and second axially facing sides 50a and 50b of the tooth attachment portion 58. The first teeth 52 are preferably integrally formed with the tooth attachment portion 58 and the mounting section 56 as a one-piece, unitary member.

Preferably, the central mounting section 56 is a tubular member with internal threads formed thereon such that the first sprocket $S_1$ can be threadably mounted on the outer tubular member 30 of the freewheel 13. The central mounting section 56 has an axial thickness larger than that of the tooth attachment section 58 and the teeth 52. Thus, the central mounting section 56 functions as a spacer between the first sprocket $S_1$ and the second sprocket $S_2$. In the illustrated embodiment, the threads of the central mounting section 56 do not require particular starting and ending points that would ensure a particular phase relation with the second sprocket $S_2$. In other words, no matter what the rotational position of the first sprocket $S_1$ relative to the second sprocket $S_2$, at least two of the teeth 52 will be in proper phase with the second sprocket $S_2$.

Referring now to FIGS. 8–11, the first teeth 52 and the first roots 54 of the first sprocket $S_1$ will now be discussed in more detail. The teeth 52 and the roots 54 are preferably identical to each other. Thus, all of the teeth 52 are preferably twisted or angled relative to the first center plane $P_1$ and the first and second axial sides 50a and 50b. Since the teeth 52 and roots 54 are identical to each other, only one of the teeth 52 and only one of the roots 54 will be discussed and illustrated in detail herein. Specifically, each tooth 52 basically includes a tip portion 60 and a connecting portion 62. The tip portion 60 is located radially outwardly of the connecting portion 62. The connecting portion 62 extends from an outer periphery of the first sprocket body 50 to the tip portion 60.

The tip portion 60 basically includes a first side surface 64a, a second side surface 64b and an end surface 64c extending between the first and second side surfaces 64a and 64b. The end surface 64c is preferably a twisted circumferentially extending flat surface that forms an outer periphery of the tooth 52. The second side surface 64b is tapered away from the end surface 64c toward the second axial side 50b of the tooth attachment portion 58. Additionally, the second side surface 64b is preferably tapered in the peripheral direction. The second side surface 64b is preferably a flat, planar surface.

The first side surface 64a is preferably formed of a plurality of flat, planar surface sections in a faceted manner. In particular, the first side surface 64a preferably includes an outwardly tapered section 65a, an inwardly tapered section 65b and a non-tapered section 65c. The outwardly tapered section 65a preferably extends radially inwardly and tapers outwardly toward the first axial side 50a of the tooth attachment portion 58. The inwardly tapered section 65b preferably extends radially inwardly from and tapers from the outwardly tapered section 65a toward the second axial side 50b of the tooth attachment portion 58. The non-tapered section 65c extends rearwardly from a forward edge of the tip portion 60 and intersects the outwardly and inwardly tapered sections 65a and 65b.

The non-tapered section 65c is preferably substantially parallel to the first axial side 50a of the sprocket attachment section 58. Moreover, the non-tapered section 65c is preferably axially aligned with the first axial side 50a. The outwardly and inwardly tapered sections 65a and 65b are preferably tapered in the peripheral direction (forward rotational) toward the first axial side 50a so that the tip portion 60 is basically twisted relative to the first center plane $P_1$. The outwardly tapered section 65a, inwardly tapered section 65b and non-tapered section 65c of the first side surface 64a are non-parallel with the second side surface 64a. Thus, the first side surface 64a is preferably non-parallel with the second side surface 64b.

The connecting portion 62 of the tooth 52 includes a recessed side surface 66 arranged on the first axial side 50a of the tooth 52. The second side surface 64b of the tip portion 60 extends radially inwardly to form the second side of the intermediate, connecting portion 62. In other words, the tooth 52 has substantially the same profile on both the tip portion 60 and the connecting portion 62 on the second axial side 50b thereof. The recessed side surface 66 is axially offset from the first axial side 50a of the tooth attachment portion 58. Thus, the recessed side surface 66 is also preferably axially offset from the non-tapered section 65c of the first side surface 64a.

The recessed side surface 66 is preferably tapered in the forward peripheral direction toward the first axial side 50a of the tooth attachment portion 58. More specifically, the recessed side surface 66 is preferably substantially parallel to the first axial side 50a of the tooth attachment section 58 in the area located in the rearward peripheral direction from the tip portion 60 and then tapers in the forward peripheral direction toward the first axial side 50a of the tooth attachment portion 58. The recessed side surface is preferably offset between about 0.2 and about 0.6 millimeters from the first axial side 50a. In any case, all of the surfaces/sections on the first side of the tooth 52 are at least partially tapered in the peripheral direction, except for the non-tapered section 65c of the tip portion 60 and the rearward section of the recessed side surface 66. Thus, the recessed side surface 66 is arranged and configured to be at least partially axially closer to the second axial side 50b of the tooth attachment portion 58 along a rearward edge of the recessed side surface 66 than the first side surface 64a of the tip portion 60. Moreover, the recessed side surface 66 is arranged and configured to be at least partially axially closer to the second axial side 50b of the tooth attachment portion 58 than the first side surface 64a of the tip portion 60.

Furthermore, the recessed side surface 66 is preferably closer to the second axial side 50b of the tooth attachment portion 58 along the rearward edge than at least a portion of the forward edge of the tooth 52 (e.g., due to the tapered configuration of the recessed side surface 66). Thus, the recessed side surface 66 is preferably axially offset toward the second axial side 50b of the tooth attachment portion 58 from the tip portion 60 to form a recess in order to facilitate down shifting of the chain 23 from the first sprocket $S_1$ to the second sprocket $S_2$. In particular, the recess formed by the recessed side surface 66 provides space for one of the inner link plates 23a of the chain 23 to be moved axially closer to the second axial side 50b of the tooth attachment portion 58. Thus, the chain 23 can be efficiently down shifted regardless of whether the inner or outer link plates 23a or 23b are arranged on the tooth 52 that is in proper phase relation with the teeth of the second sprocket $S_2$.

The first roots 54 are preferably identical to each other as mentioned above. Thus, only one of the first roots 54 will be discussed and illustrated in detail herein. Each root 54 includes a chamfered surface 68a and a peripheral surface 68b. Both the chamfered surface 68a and the peripheral surface 68b extend between adjacent pairs of the first teeth 52. Each chamfered surface 68a is located on the first axial side 50a of the tooth attachment portion 58. Thus, each chamfered surface 68a intersects opposite ends of a pair of the recessed side surfaces 66 of adjacent teeth 52. Moreover, on the forward peripheral end of each tooth 52, the chamfered surface 68a also intersects the first side surface 64a of the tip portion 60. More specifically, the chamfered surface 68a intersects the inwardly tapered section 65b and the non-tapered section 65c of the first side surface 64a of the tip portion 60.

The chamfered surface 68a tapers axially outwardly and radially inwardly from the peripheral surface 68b toward the first axial side 50a of the tooth attachment portion 58. This arrangement limits interference of the roots 54 with the inner link plates 23a of the chain 23. The chamfered surface 68a preferably forms an angle of about forty-five degrees with the first axial side 50a. The chamfered surface 68a preferably has a maximum axial dimension of about 1.0 millimeters and a maximum radial dimension of about 1.0 millimeters. Of course, the axial and radial dimensions of the chamfered surfaces 68a are slightly smaller in the areas where the chamfered surfaces 68a intersect the recessed side surface(s) 66.

Referring now to FIGS. 12–22, the second sprocket $S_2$ will now be discussed in more detail. The second sprocket $S_2$ preferably includes a second sprocket body 70, a pair of second down shift teeth 72, a plurality of second driving teeth 73 and a plurality of roots 74 arranged in a circumferentially alternating manner between the second down shift teeth 72 and the second driving teeth 73. In the illustrated embodiment, the second down shift teeth 72 are preferably circumferentially equally spaced from each other with seven (7) of the second driving teeth 73 arranged therebetween. Thus, the second sprocket $S_2$ preferably has sixteen total teeth.

The second sprocket body 70 has a third axially facing side 70a, a fourth axially facing side 70b and a splined mounting section 71 configured to be mounted on the second outer tubular portion 42 of the outer tubular member 30 of the freewheel 13. Thus, the second sprocket $S_2$ is designed to be arranged in a particular phase relationship relative to the third sprocket $S_3$, discussed briefly below. In particular, the third axial side 70a faces the first sprocket $S_1$, while the fourth axial side 70b faces the third sprocket $S_3$. Thus, the second down shift teeth 72 are arranged in a particular phase relationship relative to certain teeth of the third sprocket $S_3$. More specifically, the second sprocket $S_2$ is designed such that the second down shift teeth 72 are arranged to be at least partially circumferentially aligned with a shifting recess formed on the third sprocket $S_3$ to facilitate down shifting from the second sprocket $S_2$ to the third sprocket $S_3$ via a pair of down shift paths.

All of the second teeth 72 and 73 of the second sprocket $S_2$ are twisted in the peripheral direction such that when the chain 23 is down shifted from the first sprocket $S_1$, it can be received on any of the teeth 72 or 73, depending on the phase relationship between the first and second sprockets $S_1$ and $S_2$. In other words, while any of the second teeth 72 and 73 can receive the chain 23 from the first sprocket $S_1$, only two of the second teeth 72 and 73 will actually be in proper phase with the teeth 52 of the first sprocket $S_1$ in a given mounting orientation of the first sprocket $S_1$. More specifically, because the mounting section 56 of the first sprocket $S_1$ is threadedly coupled to the freewheel 13, certain teeth of the teeth 72 and 73 will be arranged in proper phase relation to receive the chain 23 from the first sprocket $S_1$.

The two down shift teeth 72 of the second sprocket $S_2$ are also designed to assist in down shifting the chain 23 from the second sprocket $S_2$ to the third sprocket $S_3$, as mentioned above. In particular, each of the down shift teeth 72 has a recessed side surface 76 formed on the third axial side 70a thereof. The third axial side 70a faces in the same direction as the first axial side 50a of the first sprocket $S_1$. Thus, the third axial side 70a faces the second axial side 50b of the first sprocket $S_1$. The recessed side surface 76 functions in a manner similar to the recessed side surface 66 of the first sprocket $S_1$. In particular, the recessed side surface 76 allows an inner link plate 23a of the chain 23 to move axially closer to the fourth axial side 70b during a down shift from the second sprocket $S_2$ to the third sprocket $S_3$.

The recessed side surface 76 has a depth in its forward rotational area (that is parallel to the third side surface 70a) of about 0.25 millimeters that tapers in its rearward area to a depth of about 0.6 millimeters. Thus, the third axial side 70a is preferably axially offset about 0.25 millimeters from a forward/leading edge of the tip of the tip portion of the tooth 72. A rearward edge of the tooth 72 is preferably substantially aligned with the fourth axial side 70b. More specifically, the rearward edge of the tooth 72 is preferably offset about 0.1 millimeters from the fourth axial side 70b. Similarly, the rearward edge of the tooth 73 is also preferably substantially aligned with or offset about 0.1 millimeters from the fourth axial side 70b. The leading edge of the tooth 73 is preferably axially aligned with the third axial side 70a.

Because the second sprocket $S_2$ has a splined mounting section 71, the phase relationship between the second and third sprockets $S_2$ and $S_3$ are predetermined, and thus, only a pair of down shift teeth 72 are needed. Of course, it will be apparent to those skilled in the bicycle art from this disclosure that the number of down shift teeth 72 depends on the number of desired down shift paths to the third sprocket $S_3$ are desired. Thus, the number of down shift teeth 72 depends on the number of down shift areas formed on the third sprocket $S_3$. However, the present invention is optimized for first-third sprockets $S_1$–$S_3$ having an even number of teeth, and having a pair of down shift paths between the second and third sprockets $S_2$–$S_3$.

Figure 23:
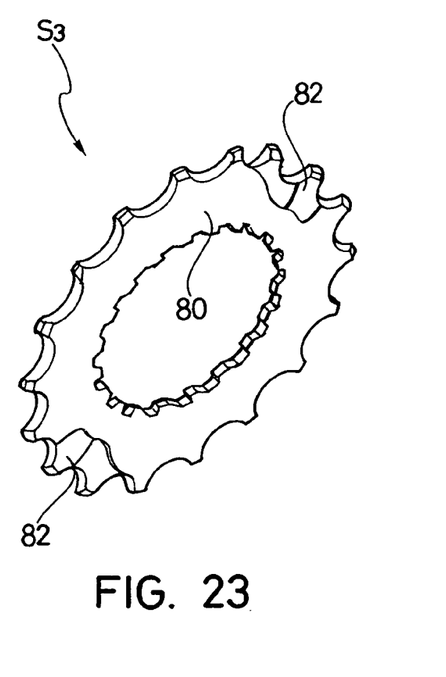
FIG. 23 is an outside (small sprocket side) perspective view of a third sprocket of the sprocket assembly illustrated in FIGS. 2 and 3, which has eighteen teeth.

Referring now to FIG. 23, the third sprocket $S_3$ will now be discussed in more detail. The third sprocket $S_3$ is designed substantially in accordance with U.S. Pat. No. 4,899,521, except the third sprocket $S_3$ has an eighteen tooth (18T) configuration. Thus, the third sprocket $S_3$ basically includes a third sprocket body 80 with oppositely facing axial sides, and a plurality of teeth extending outwardly from the sprocket body 80. More specifically, the third sprocket $S_3$ includes a pair of chain guide portions 82 designed in accordance with the chain guide portions 4 of U.S. Pat. No. 4,899,521, which allow the chain to deviate toward the fourth sprocket side of the second sprocket $S_2$ when the chain 23 is being down shifted from the second sprocket $S_2$ to the third sprocket $S_3$. The chain guide portions 82 are circumferentially equally spaced from each other to be properly aligned with the second down shift teeth 72 of the second sprocket $S_2$ for smooth, reliable down shifting therebetween.

MODIFIED TOP SPROCKET

In accordance with another preferred embodiment of the present invention, a modified first/top sprocket (not shown) can be provided that has thirteen teeth (i.e., a 13T configuration). This modified top sprocket is designed to be used with the sprocket assembly 12 in place of the sprocket $S_1$. Because this modified top sprocket is substantially identical to the sprocket $S_1$, this modified top sprocket will not be discussed and/or illustrated in detail herein. Rather, it will be apparent to those skilled in the bicycle art from this disclosure that the descriptions and/or illustrations of the sprocket $S_1$ also apply to this modified top sprocket, except as explained below.

Specifically, this modified top sprocket is identical to the sprocket $S_1$ except for the number of teeth. In other words, this modified top sprockets has thirteen circumferentially equally spaced teeth identical to the teeth 52 (see FIGS. 5–11) of the sprocket $S_1$ to form thirteen circumferentially equally spaced roots identical to the roots 54 of the sprocket $S_1$. Moreover, this modified top sprocket preferably includes a sprocket body identical to the sprocket body 50 of the sprocket $S_1$ and is mounted to the freewheel 13 in a manner identical to the sprocket $S_1$. Of course, it will be apparent to those skilled in the bicycle art from this disclosure that slight modifications to the teeth, roots and sprocket body could be needed in this modified top sprocket because of the smaller number of teeth.

With this modified top sprocket, at least one smooth down shift path will be formed in order to shift the chain 23 from the modified top sprocket to the second sprocket $S_2$. More specifically, two smooth down shift paths are preferably formed between such a modified top sprocket and the second sprocket $S_2$. However, with this modified top sprocket, the two down shift paths are not equally spaced from each other in the circumferential direction because of the odd number (13T) of teeth of this modified top sprocket. In other words, the precise phase relationship of this modified top sprocket relative to the second sprocket $S_2$ is not critical to providing smooth reliable down shifting.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A top sprocket for a rear sprocket assembly of a bicycle, said top sprocket comprising:
    a sprocket body having a tooth attachment portion with first and second sides with a center plane arranged therebetween such that said first side faces in a first axial direction and said second side faces in a second axial direction; and
    a plurality of circumferentially spaced teeth extending radially outwardly from an outer periphery of said tooth attachment portion between said first and second sides to form a plurality of circumferentially spaced roots arranged in an alternating arrangement between said teeth,
    a first tooth of said teeth including
        a tip portion having a first side surface facing in said first axial direction, a second side surface facing in said second axial direction and an end surface extending between said first and second side surfaces, and
        a recessed side surface extending in a peripheral direction and facing in said first axial direction, said recessed side surface being located radially inwardly of said first side surface of said tip portion, said recessed side surface and said tip portion being configured such that said first side surface of said tip portion is located at least partially axially further away from said center plane of said top sprocket than said recessed side surface,
        said recessed side surface being further arranged and configured to be at least partially axially closer to said second side along a rearward portion of said recessed side surface than a forward portion of said recessed side surface.

2. The sprocket according to claim 1, wherein at least one of said roots arranged adjacent said first tooth is chamfered on said first side thereof.

3. The sprocket according to claim 2, wherein said chamfered root is positioned in a forward direction from said first tooth.

4. The sprocket according to claim 1, wherein said recessed side surface is tapered in said peripheral direction to be angled relative to said center plane.

5. The sprocket according to claim 1, wherein said end surface of said tip portion is twisted relative to said center plane.

6. The sprocket according to claim 1, wherein said sprocket body has a central mounting section arranged radially inwardly of said tooth attachment portion.

7. The sprocket according to claim 1, wherein said first and second side surfaces of said tip portion have first and second outer edges, respectively, and said first and second outer edges are substantially parallel.

8. The sprocket according to claim 1, wherein said first and second side surfaces of said tip portion are non-parallel flat surfaces.

9. A multi-stage sprocket assembly for a bicycle comprising:
    a first sprocket including
    a first sprocket body having a threaded mounting section located at an inner periphery thereof and a tooth attachment portion extending radially outwardly of said threaded mounting section, said tooth attachment portion having having first and second sides facing in first and second axial directions, respectively, with a center plane arranged therebetween, and
    a plurality of circumferentially spaced first teeth extending radially outwardly from an outer periphery of said tooth attachment portion to form a plurality of circumferentially spaced first roots arranged in an alternating arrangement between said first teeth,
    a first down shift tooth of said first teeth including
        a tip portion having a first side surface facing in said first axial direction, a second side surface facing in said second axial direction and an end surface extending between said first and second side surfaces, and
        a recessed side surface extending in a peripheral direction and facing in said first axial direction, said recessed side surface being located radially inwardly of said first side surface of said tip portion, said recessed side surface and said tip portion being configured such that said first side surface of said tip portion is located at least partially axially further away from said center plane of said top sprocket than said recessed side surface,
        said recessed side surface being further arranged and configured to be at least partially axially closer to said second side along a rearward portion of said recessed side surface than a forward portion of said recessed side surface; and a second sprocket disposed adjacent said first sprocket that is larger than said first sprocket, said second sprocket having a third axially facing side adjacent said second side of said first sprocket and a fourth axially facing side, said second sprocket including a second sprocket body, and a plurality of circumferentially spaced second teeth extending radially outwardly from an outer periphery of said second sprocket body.

10. The multi-stage sprocket assembly according to claim 9, wherein
at least one of said first roots arranged adjacent said first down shift tooth is chamfered on said first side thereof.

11. The multi-stage sprocket assembly according to claim 10, wherein
said chamfered first root is positioned in a forward direction from said first down shift tooth.

12. The multi-stage sprocket assembly according to claim 9, wherein
said recessed side surface is tapered in said peripheral direction to be angled relative to said center plane.

13. The multi-stage sprocket assembly according to claim 9, wherein
said end surface of said tip portion is twisted relative to said center plane.

14. The multi-stage sprocket assembly according to claim 9, wherein
said threaded mounting section includes a threaded mounting hole.

15. The multi-stage sprocket assembly according to claim 9, wherein
said first and second side surfaces of said tip portion have first and second outer edges, respectively, and
said first and second outer edges are substantially parallel.

16. The multi-stage sprocket assembly according to claim 9, wherein
said first and second side surfaces of said tip portion are non-parallel flat surfaces.

17. The multi-stage sprocket assembly according to claim 9, wherein
at least one of said second teeth is a down shift tooth having a recessed third side surface that is offset from said third side of said second sprocket body.

18. The multi-stage sprocket assembly according to claim 9, wherein
a pair of said second teeth are down shift teeth with each having a recessed third side surface that is offset from said third side of said second sprocket body.

19. The multi-stage sprocket assembly according to claim 9, wherein
said second sprocket has a splined central mounting section.

20. The multi-stage sprocket assembly according to claim 9, further comprising:
a third sprocket mounted adjacent said second sprocket that is larger than said second sprocket.

* * * * *